Feb. 28, 1956  B. BERKOWITZ  2,736,896
HORN ANTENNA SYSTEM
Filed Dec. 4, 1951
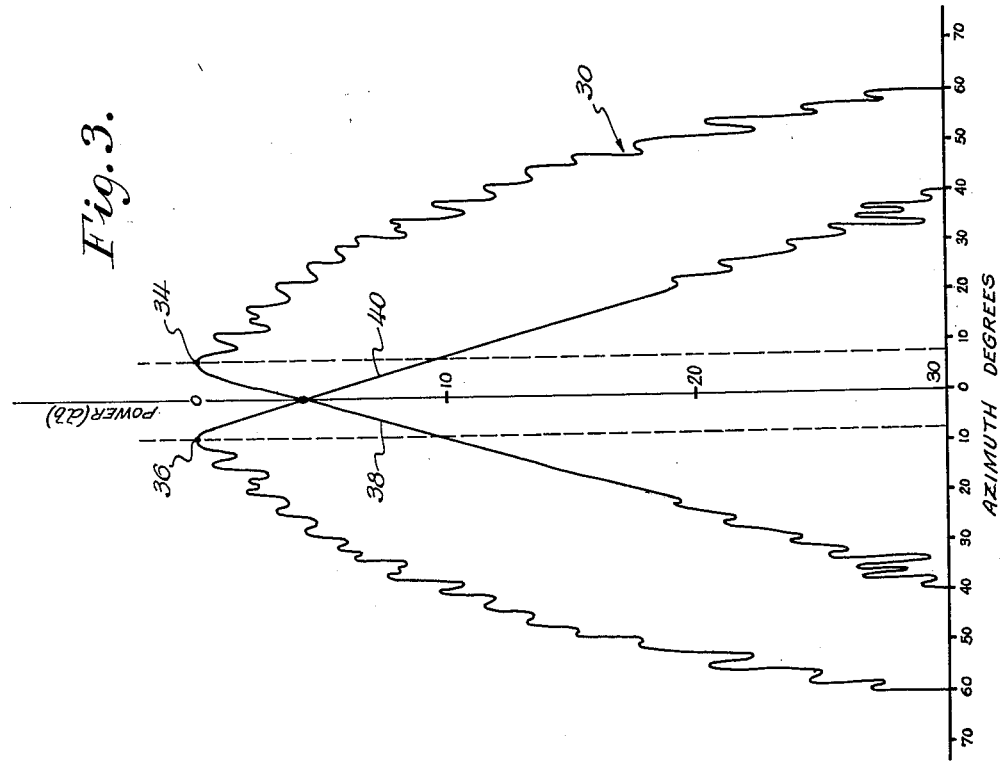
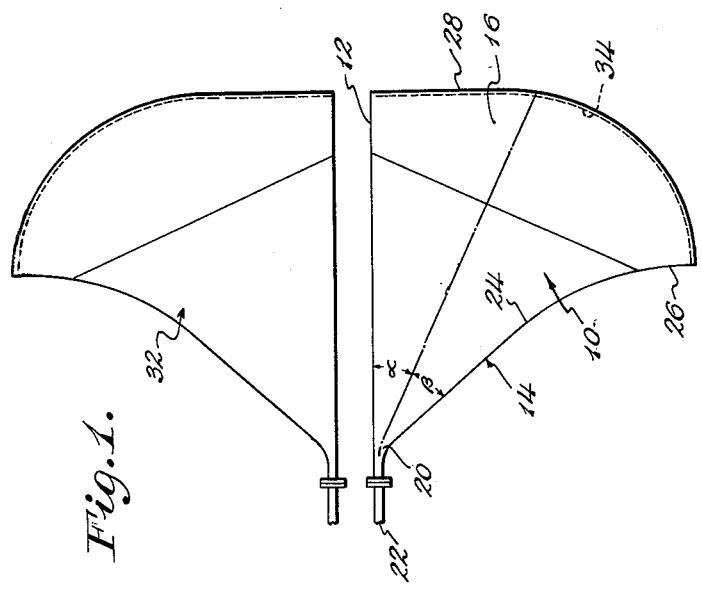
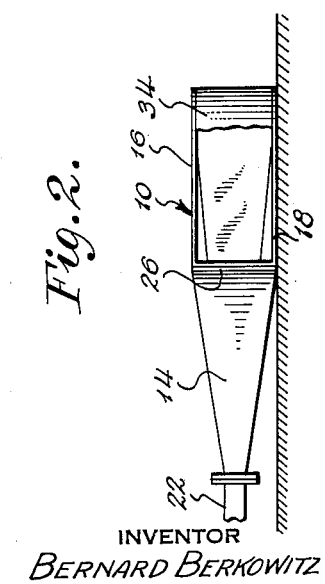
INVENTOR
BERNARD BERKOWITZ
BY
ATTORNEY

United States Patent Office 2,736,896
Patented Feb. 28, 1956

2,736,896

HORN ANTENNA SYSTEM

Bernard Berkowitz, Jamaica, N. Y., assignor to Sperry Rand Corporation, a corporation of Delaware Application December 4, 1951, Serial No. 259,862

9 Claims. (Cl. 343—776)

This invention relates to antenna systems, and more particularly, to an electromagnetic horn system for transmitting high frequency radiant energy in a predetermined space pattern for use in an aircraft blind-landing system.

Various systems have been proposed in the prior art in which an electromagnetically defined flight pattern is utilized for guiding an aircraft to a landing onto the runway of an airport. Such a flight pattern usually is defined in space by the intersection of a predetermined vertical plane coinciding with the center line of the runway, and a glide plane at right angles thereto and inclined at a slight angle with the horizontal. Such planes in space may be established by a pair of overlapping microwave radio beams, the equisignal zone of the overlapping beams essentially defining a straight-line path which is located by suitable receiver apparatus carried by the airplane. The receiver indicates the deviation of the airplane's position with respect to the established pattern so the pilot may correct the flight of the airplane to fly it on the proper course.

In such a system, as for example in orienting the airplane with the center line of the runway, the space pattern of the radio beams, commonly referred to as the localizer pattern, must be accurately established and have a special configuration to give maximum accuracy and sensitivity around the equisignal zone. In general, the receiver apparatus is designed to detect the difference in energy level as derived from the two beams as the aircraft deviates from the equisignal zone, the difference in energy being indicative of the degree of deviation to the right or left of the runway. To achieve maximum sensitivity it is therefore desirable that the difference in energy level between the two beams change rapidly within a rather narrow range, preferably within a range of the order of 5° of azimuth on either side of the equisignal zone, and further, that the difference in energy (expressed in decibels) in this region change linearly with this deviation. In addition, it is desirable that the space pattern extend through a large angle in either direction from the equisignal zone, such angle being preferably of the order of 80° to either side of the center line of the runway. The airplane, when flying in a region beyond the 5° region, must receive a signal giving a full off-course indication, whether to the right or left as the case may be. The two beams forming the localizer pattern are therefore required to be asymmetrical in shape.

Various antenna systems have been heretofore proposed in the prior art for establishing space patterns of the type described. However, such systems have either used a complicated array of separate antenna structures to get proper distribution of energy in space or, where a less complex antenna structure has been developed, it has been done so at a sacrifice in sensitivity in the equisignal region. Furthermore, where a number of separate antenna structures are utilized to establish the desired space pattern, various means must be incorporated to prevent distortion of the space pattern by the addition and cancellation of energy from the separate antennas at various points in space and to shield the antennas from each other to prevent cross radiation. Thus, in one known system of this type four separate antenna structures are successively energized to achieve the desired results outlined above, making an expensive and cumbersome arrangement.

It is the general object of this invention to avoid and overcome the foregoing and other difficulties in and objections to the prior art practices by the provision of an electromagnetic horn structure for transmitting an asymmetrical beam of the type described which is characterized by its simplicity of design, ease of manufacture and installation, and overall compactness.

Another object of this invention is to provide a horn-type antenna which can be used symmetrically with a mirror-image antenna of similar structure to produce overlapping beams forming the desired localizer pattern.

Another object of this invention is the provision of a horn-type antenna which when used with a second horn of mirror-image construction establishes its own beam independently and without any distorting effect from the other horn.

Another object of this invention is to provide a microwave horn structure which radiates an asymmetrical space pattern in which the energy falls rapidly and linearly with deviation in one direction from the line of maximum energy, but which falls off relatively slowly and extends through a large angle of deviation in the other direction from the line of maximum energy.

Another object of this invention is to provide a microwave horn structure which establishes an asymmetrical beam without the use of lens structure or any wave shaping means other than the confining walls of the horn itself.

These and other objects of the invention which will become apparent as the description proceeds are achieved by the provision of an electromagnetic horn for transmitting ultra-high frequency radio energy from a rectangular wave guide, the horn including four bounding walls forming extensions of the four sides of the wave guide. The four walls are substantially straight in any cross-section transverse to the longitudinal axis of the wave guide. One wall of the horn forms a flat straight extension of one broad side of the wave guide, while the opposite wall of the horn flares outwardly at an angle and curves arcuately near the outer extremity to form a wide mouth at the aperture of the horn. The two remaining enclosing walls have their outer edges extending between the outer extremity of the straight way and opposite flaring wall, the outer edge of these enclosing walls being substantially straight and perpendicular to the one straight wall for a substantial distance and then curving to join the extremity of the flaring wall.

For a better understanding of the invention, reference should be had to the accompanying drawings wherein:

Fig. 1 is a plan view of a pair of the antenna horns embodying the features of this invention;

Fig. 2 is a side elevational view of one of the horns; and

Fig. 3 is a graphical representation of the variation in energy with the change in azimuth established by the overlapping beams radiated by the horns.

With particular reference to the invention as illustrated in Figs. 1 and 2, the numeral 10 indicates generally a horn for radiating electromagnetic energy, the horn having four enclosing walls 12, 14, 16, and 18. The four walls converge to a substantially rectangular throat portion 20 where the horn is coupled to a rectangular wave guide 22.

The wall 12 is a relatively narrow planar surface which forms a straight extension of one of the broad sides of the wave guide 22, the longitudinal edges of planar wall 12 preferably diverging slightly beyond the throat-forming portion. The opposite wall 14 is parallel to the planar wall 12 adjacent the wave guide 22 in the throat portion of the horn and then flares outwardly at a large angle, of the order of 55°, along a straight or planar portion 24; the outermost portion 26 of the flaring wall 14 curves gradually outwardly so that the flaring wall terminates tangentially to a plane substantially perpendicular to the planar wall 12, although it may curve even more without unduly distorting the beam pattern. It will be noted that the curved outermost portion 26 forms a substantial part of the lentgh of the wall 14, the planar portion and curved portion being approximately equal in length as shown.

While the confining top and bottom walls 16 and 18 are shown as diverging from the throat of the horn, they may be maintained closely spaced and substantially parallel out to the region of the mouth of the horn. By varying the region of divergence of the confining walls, as for example, maintaining the confining walls parallel radially from the throat for distances which are greater along the flaring wall 14 than along the wall 12, the phase front of the emergent energy may be affected to provide additional limited control of the space pattern.

The outer edge of the top and bottom confining walls 16 and 18 extends perpendicularly in a straight line, as indicated at 28, from the extremity of the planar wall 12 for a distance subtending an angle α at the throat of the horn. The edge then curves substantially arcuately to meet the extremity of the flaring side wall 14 to complete the horn structure. A thin plastic covering 34, commonly referred to as a radome, is generally provided to seal off the mouth of the horn, the radome being made of a material and thickness as not to affect the radiation of energy from the horn.

The distribution of energy out in space taken at a given radial distance from the horn 10 is shown by the curve 30 of Fig. 3. It will be noted that the above described horn structure, when operated in conjunction with a second horn 32 of the same configuration but a mirror image of the horn 10, cooperates with the second horn to produce overlapping microwave beams which have maximum energy, as indicated at 34 and 36, approximately 5° either side of the zero azimuth or direction along which the two beams are of equal strength. The energy in decibels in both beams changes linearly within this region, as indicated by the straight portion of the curves at 38 and 40. The slope of the linear portion of the curves within the 5° region is fairly steep so that a large change in energy level of the respective beams is effected by small deviations in azimuth, resulting in high sensitivity in the equisignal zone where the beams overlap. Beyond the 5° region on either side of the zero azimuth, the difference in energy levels of the two beams remains at a large value out to angles of the order of 75°, the difference energy being sufficient to maintain a maximum off-course indication at the receiver. Fig. 3 is representative of the performance curves obtainable by the horn structures of the present invention and is not a theoretical curve.

The effect and importance of the various structural features of the horn will now be considered. First it must be borne in mind that the operation of the horn in the manner described requires that polarization of the microwave energy be transverse to the side walls 12 and 14. By making one side wall a flat, straight extension of the broad side of the wave guide the maximum energy is directed straight ahead, since the phase relationship within the region included by the angle α may be considered as uniform. The straight edge at the outer extremity of the wall 12 at the horn aperture gives rise to Fresnel diffraction of the propagated wave so that as measured out in space, the energy expressed in decibels, instead of dropping off abruptly to the left of the plane of the wall 12, drops off substantially linearly from a peak at approximately 5° to the right of the plane of the wall 12, as viewed in the drawings.

The straight edge portion 28 of the top and bottom walls function as an axis of rotation for the space pattern in elevation. Thus when the horn is used alongside a horn of mirror-image construction, by making the straight portions perpendicular to the parallel side walls, the rotation of both horn elevation patterns takes place about the same axis, which insures that the azimuthal cross-over portions of the respective beams will be similar at all angles of elevation.

The portion of the horn included by the angle β radiates power for the wide angle or fill region to augment the power radiated in the cross-over region. The ratio of β to α is determined by the desired ratio of power in the fill region to the power in the cross-over region. By curving the outer extremity of the wall 14, as at 26, since the electric energy lines must terminate perpendicular to the walls 12 and 14, there is considerable curving of the emergent wave front in this region so that the radiated energy is directed through a wide angle. By limiting the curvature so that the extremity of the otuer wall 14 is tangential to a plane substantially perpendicular to the side wall 12, distorting reflections within the horn which may be set up by energy reflected back into the horn by the plastic radome are avoided.

From the above description it will be recognized that the objects of the invention have been achieved by the provision of a microwave antenna of a horn-type which radiates an asymmetrical beam having the desired space characteristics. The horn may be used alongside a second horn of mirror-image construction to give a pair of overlapping asymmetrical beams. The planar wall construction not only provides certain desired shaping characteristics but practically eliminates any effects resulting from energy radiated by one horn "spilling over" into the other horn and does so without excessive spacing between horns or any special shielding means.

While the horns of the antenna system have been specifically described as forming extensions of rectangular wave guides, any suitable transmission line may be used to transmit energy to the individual horns. Energy may then be launched in the throat portion of the horns by any well known method, such as a dipole element, as long as the energy is polarized with the E vector perpendicular to the flaring wall as previously described.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An electromagnetic horn for radiating ultra-high frequency radiant energy from a rectangular wave guide, said horn including four bounding walls forming extensions of the four sides of the wave guide, the four walls being substantially straight in any cross-section transverse to the longitudinal axis of the wave guide, one wall forming a substantially straight, flat extension of the broad side of the wave guide, the opposite wall of the horn forming an extension of the other of the broad sides of the wave guide and flaring outwardly for a portion of its length at an angle to said one wall and curving outwardly for the remaining portion away from said one wall, the outer extremity of said opposite wall being tangential to a plane substantially perpendicular to said one wall, the outer edge of the remaining enclosing walls extending between the outer extremities of said one and said opposite walls of the horn and being straight and perpendicular for a substantial portion thereof to said one wall, and then curving substantially arcuately and tangentially to said straight portion to join the extremity of said opposite wall, said enclosing walls flaring outwardly at an angle from the narrow sides of the wave guide.

2. An electromagnetic horn for radiating ultra-high frequency radiant energy from a rectangular wave guide, said horn including four bounding walls forming extensions of the four sides of the wave guide, one wall forming a substantially straight, flat extension of the broad side of the wave guide, the opposite wall of the horn forming an extension of the other of the broad sides of the wave guide and flaring outwardly for a portion of its length at an angle to said one wall and curving outwardly for the remaining portion away from said one wall, the outer extremity of said opposite wall being tangential to a plane substantially perpendicular to said one wall, the outer edge of the remaining enclosing walls extending between the outer extremities of said one and said opposite walls of the horn, said enclosing walls flaring outwardly at an angle from the narrow sides of the wave guide.

3. An electromagnetic horn for radiating ultra-high frequency radiant energy from a rectangular wave guide, said horn including four bounding walls forming extensions of the four sides of the wave guide, one wall forming a substantially straight, flat extension of the broad side of the wave guide, the opposite wall of the horn forming an extension of the broad sides of the wave guide and flaring outwardly for a portion of its length at an angle to said one wall and curving outwardly for the remaining portion away from said one wall, the outer edge of the remaining enclosing walls extending between the outer extremities of said one and opposite walls of the horn, said enclosing walls flaring outwardly at an angle from the narrow sides of the wave guide.

4. A horn for radiating electromagnetic energy in space, said horn including a relatively narrow planar wall, a flaring wall parallel to said planar wall for a small portion adjacent one end thereof and flaring at a relatively large angle to said planar wall throughout the remaining portion thereof, the outer half of the second wall gradually curving outwardly away from said planar wall and terminating substantially perpendicularly to said planar wall, confining walls joining the longitudinal edges of the planar wall and the flaring wall, the four walls combining to form a substantially rectangular throat portion in the region in which the planar wall and flaring wall are parallel, and means communicating with said throat portion for exciting electromagnetic energy polarized perpendicularly to the planar wall.

5. A horn for radiating electromagnetic energy in space, said horn including a relatively narrow planar wall, a flaring wall parallel to said plane wall for a small portion adjacent one end thereof and flaring at a relatively large angle to said planar wall throughout the remaining portion thereof, the outer half of the second wall gradually curving outwardly away from said planar wall and terminating substantially perpendicularly to said planar wall, and confining walls joining the longitudinal edges of the planar wall and the flaring wall, the four walls combining to form a substantially rectangular throat portion in the region in which the planar wall and flaring wall are parallel.

6. An antenna system for providing an overlapping space pattern comprising a pair of adjacent horn sections, each horn including a relatively narrow planar wall, a flaring wall parallel to said planar wall for a small portion adjacent one end thereof and flaring at a relatively large angle to said planar wall throughout the remaining portion thereof, and confining walls joining the longitudinal edges of the planar wall and the flaring wall, the planar walls of each horn section being closely spaced in parallel relationship, and the confining walls of each horn section being substantially co-planar with the corresponding confining walls of the other horn section.

7. Means for radiating electromagnetic energy in an asymmetrical space pattern, said means including a first relatively narrow planar wall, a second flaring wall having a planar portion flaring at a relatively large angle to said first wall and having a remaining portion curving gradually outwardly away from the first wall, the curving portion of the second wall being a substantial portion of the entire length of the second wall, confining walls joining the first and second walls along the extent of their longitudinal edges, and means for exciting electromagnetic energy in the region defined by said walls polarized perpendicularly to the first wall.

8. A horn for radiating electromagnetic energy in space, said horn having a throat end and a mouth end and including a relatively narrow planar wall, a curved-surface wall spaced a slight distance from said straight wall at said throat end and a great distance from said straight wall at said mouth end, and confining walls joined to the longitudinal edges of said planar wall and said curved-surface wall and defining opposite boundaries of said mouth, the edge of each of said confining walls at the mouth of said horn comprising a straight portion extending substantially perpendicularly from said relatively narrow planar wall and a substantially arcuate portion continuing from the straight portion to said curved-surface wall.

9. Apparatus as defined in claim 6 wherein the edges of the confining walls at the mouths of said horn sections include straight portions extending substantially perpendicularly from the respective planar walls, straight portions of the edges of the respective horn sections lying in a common plane, said edges further including substantially arcuate portions continuing from the straight portions to said flaring walls.

References Cited in the file of this patent

UNITED STATES PATENTS

| | | |
|---|---|---|
| 2,283,935 | King | May 26, 1942 |
| 2,398,095 | Katzin | Apr. 9, 1946 |
| 2,416,675 | Beck et al. | Mar. 4, 1947 |
| 2,436,408 | Tawney | Feb. 24, 1948 |
| 2,456,323 | Risser et al. | Dec. 14, 1948 |
| 2,530,079 | Riblet | Nov. 14, 1950 |
| 2,540,839 | Southworth | Feb. 6, 1951 |
| 2,594,871 | Chu et al. | Apr. 29, 1952 |
| 2,596,190 | Wiley | May 13, 1952 |